United States Patent
Kitchin

(10) Patent No.: US 7,385,926 B2
(45) Date of Patent: Jun. 10, 2008

(54) APPARATUS TO SPECULATIVELY IDENTIFY PACKETS FOR TRANSMISSION AND METHOD THEREFOR

(75) Inventor: Ducan M. Kitchin, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1045 days.

(21) Appl. No.: 10/304,391

(22) Filed: Nov. 25, 2002

(65) Prior Publication Data

US 2004/0100981 A1 May 27, 2004

(51) Int. Cl.
    *H04L 12/56* (2006.01)
(52) U.S. Cl. .................................. 370/236; 370/328
(58) Field of Classification Search ................ 370/235, 370/236, 328, 338, 395.4
    See application file for complete search history.

(56) References Cited

U.S. PATENT DOCUMENTS

| | | | |
|---|---|---|---|
| 5,757,511 A * | 5/1998 | Kaneyama | 358/403 |
| 5,883,892 A | 3/1999 | Taniguchi | |
| 6,577,596 B1 * | 6/2003 | Olsson et al. | 370/230 |
| 6,691,185 B2 * | 2/2004 | Avery | 710/52 |
| 6,920,120 B2 * | 7/2005 | Huang et al. | 370/329 |
| 7,046,678 B2 * | 5/2006 | Jiang et al. | 370/395.41 |
| 7,058,071 B1 * | 6/2006 | Myles et al. | 370/419 |
| 7,085,247 B2 * | 8/2006 | Schweinhart et al. | 370/316 |
| 7,103,025 B1 * | 9/2006 | Choksi | 370/335 |
| 7,142,550 B1 * | 11/2006 | Umansky | 370/401 |
| 2002/0150064 A1 | 10/2002 | Lucidarme | |
| 2003/0090999 A1 * | 5/2003 | Janczak | 370/230 |
| 2004/0090916 A1 * | 5/2004 | Hosein | 370/235 |
| 2004/0151167 A1 * | 8/2004 | Chiussi et al. | 370/353 |
| 2005/0157714 A1 * | 7/2005 | Shlissel et al. | 370/389 |
| 2006/0268885 A1 * | 11/2006 | Varma | 370/394 |

FOREIGN PATENT DOCUMENTS

WO    WO 00/21231    4/2000

* cited by examiner

*Primary Examiner*—Min Jung
(74) *Attorney, Agent, or Firm*—Schwabe, Williamson & Wyatt, P.C.

(57) ABSTRACT

Methods and Apparatus including a packet selector are disclosed herein. The packet selector is configured to select and provide to a transmitter two or more packets, wherein at the time the two or more packets are provided to the transmitter, at least one of the provided packets is not definitely to be transmitted by the transmitter. Other embodiments are also disclosed and claimed.

21 Claims, 2 Drawing Sheets

APPARATUS TO SPECULATIVELY IDENTIFY PACKETS FOR TRANSMISSION AND METHOD THEREFOR

BACKGROUND

Wireless communication systems such as, for example, wireless local area networks (WLAN's), often involve the transferring of data in packets from one point to another. The transmission of packets may be done by a packet selector that identified the next packet to transmit based on the priorities associated with the packets waiting to be transferred. The packet selector may then provide the packet to a transmitter which, in turn, attempts to transmit the packet. The packet selector then waits for an acknowledgement signal (i.e. a success or fail indicator) from the transmitter and identifies the next packet to transmit based on the result of the last attempted transmission.

However, the use of this feedback mechanism may introduce delay in transmitting packets and reduce the overall transmission data rate within a wireless network. That is, the overall transmission data rate within the wireless network may be sacrificed because the packet selector has to wait for an acknowledgement signal to be received or not received before being able to identify and send to the transmitter the next packet for transmission. Thus, there is a continuing need for better ways to transfer packets within a wireless network.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
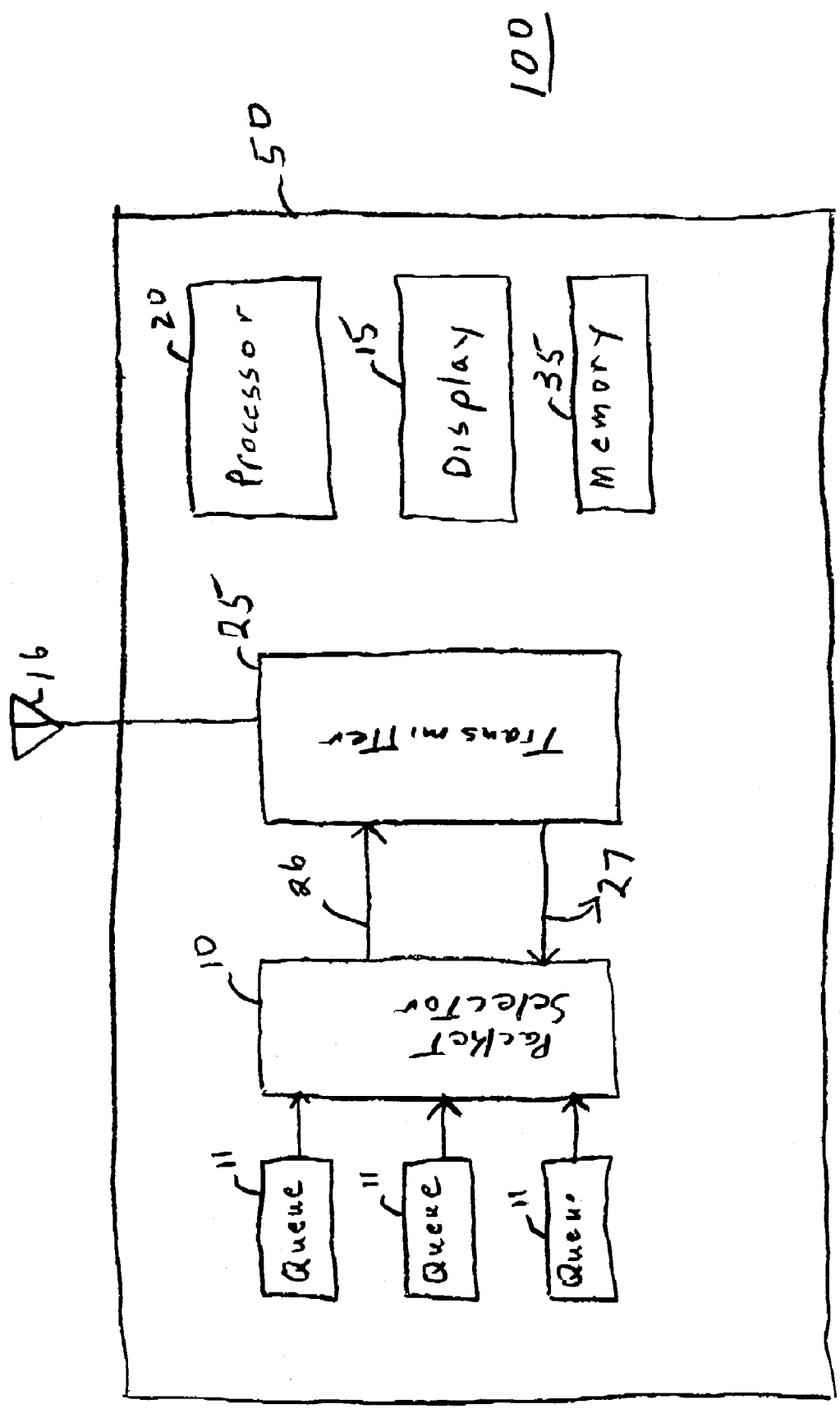
FIG. 1 is a schematic representation of a portion of wireless communication device in accordance with an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. An apparatus may be specially constructed for the desired purposes, or it may comprise a general purpose computing device selectively activated or reconfigured by a program stored in the device. Such a program may be stored on a storage medium, such as, but not limited to, any type of disk including floppy disks, optical disks, compact disc read only memories (CDROMs), magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

It should be understood that embodiments of the present invention may be used in a variety of applications. Although the present invention is not limited in this respect, the devices disclosed herein may be used in many apparatuses such as in the transmitters and receivers of a radio system. Radio systems intended to be included within the scope of the present invention include, by way of example only, cellular radiotelephone communication systems, satellite communication systems, two-way radio communication systems, one-way pagers, two-way pagers, personal communication systems (PCS), personal digital assistants (PDA's), wireless local area networks (WLAN), personal area networks (PAN, and the like.

Turning to FIG. 1, an embodiment 100 in accordance with the present invention is described. Embodiment 100 may comprise a wireless communication device 50 such as a mobile communication device (e.g., cell phone), a two-way radio communication system, a one-way pager, a two-way pager, a personal communication system (PCS), a portable computer, an access point, a base station, a network server, or the like. Although it should be understood that the scope and application of the present invention is in no way limited to these examples. It should also be understood that only a portion of the components of wireless communication device 50 have been shown for clarity. In addition, although the embodiment shown in FIG. 1 is a "wireless" device, in alternative embodiments, packets of data may be transmitted over a wire or wired connection. In yet other embodiments, packets of data may be transmitted over a communication link that includes any combination of both wired and wireless legs.

Embodiment 100 here includes an processor 20 that may comprise, for example, a microprocessor, a central processing unit (CPU), a digital signal processor, a microcontroller, a reduced instruction set computer (RISC), a complex instruction set computer (CISC), or the like. However, it should be understood that the scope of the present invention is not limited to these examples. Embodiment 100 may also optionally include other components such as a display 15 to present information to a user.

Wireless communication device 50 may also include memory 35 that may optionally be used to store instructions that are executed by processor 20 during the operation of wireless communication device 50, and may be used to store user data such as the conditions for when a message is to be transmitted by wireless communication device 50 or the actual data to be transmitted. Memory 35 may be provided by one or more different types of memory such as one of those described above. For example, memory 35 may be volatile memory (any type of random access memory) or non-volatile memory, such as flash memory, although the scope of the present invention is not limited in this respect.

In this particular embodiment, wireless communication device 50 may also include a packet selector 10 and queues 11 to store and identify the packets to be transmitted. Although the scope of the present invention is not limited in this respect, queues 11 may be used to store packets of information to be transmitted and may be arranged to store packets of varying priority or class level. In other words, one queue 11 may store packets that are of greater significance or are to be transmitted by wireless communication device 50 before the packets in another one of queues 11. Alternatively or additionally, Queues 11 may also store packets based on other criteria such as the content of the packet, the destination, the source, the age, etc, although the scope of the present invention is not limited in this respect. Queues 11 may be provided using a variety of techniques such as, for example, random access memory, non-volatile memory, etc.

Although the scope of the present invention is not limited in this respect, queues 11 may be arranged a first-in-first-out (FIFO) queues that provide the packets to be transmitted to packet selector 10 in about the order they were received. Queues 11 may also be arranged to provide packets in a round-robin order or some other statistical approach that allows for packets to be transmitted in some balanced manner that allows for transmitting packets in some combination of lower and higher priority packets.

In alternative embodiments, queues 11 may include or be provided using interrupts or other signaling method to identify the relative priority of each packet with respect to the other packets to be transmitted. In addition, it should be understood that the scope of the present invention is not limited by the number, type, or particular arrangement of queues 11.

The packets stored by queues 11 may be organized in a variety of ways and include different types of data and information. Although the scope of the present invention is not limited in this respect, the packets may include data (e.g. voice, audio, video, user data, etc.) along with header information associated with the packets. For example, the header data may specify the priority, origin, destination, or security data associate with the particular packet. Alternatively, the packet may include information to permit encryption/deciphering, error code correction, etc. on the cargo of the packets. It should be understood that the scope of the invention is not limited by the particular arrangement or contents of the packets to be transmitted.

As explained in more detail below, packet selector 10 may be used to speculate and identify which of the packet or packets in queues 11 is to be transmitted in an upcoming transmission cycle. In this particular embodiment, packet selector 10 is shown primarily has a hardware block within wireless communication device 50, although the scope of the present invention is not limited in this respect. In alternative embodiments, packet selector 10 may be any combination of hardware and software, including being implemented exclusively all as hardware or all as software.

Packet selector 10 may speculate as to what packet or packets should be transmitted next or in the near future using information associated with the prior or past transmissions. Based on this information, packet selector 10 may then provide a transmitter with the packet or packets along with information to allow the transmitter to decide which packet to transmit next (arrow 26). For example, suppose the packet selector 10 initally selects and provides to the transmitter a first packet for transmission. The packet selector 10 may then preemptively provide to the transmitter, prior to receiving any indication of the success or failure of the first packet transmission, a second packet or packets from the queues 11. The second packet or packets may be selected from the queues 11 based, at least in part, by speculating on the possible outcomes (e.g., success or failure) of the transmission of the first packet.

In other words, the selection of the second packet or packets from the queues 11 may, at least in part, be dependent upon the projected possible outcomes of the first packet transmission. Along with the second packet or packets, the packet selector 10 may also provide to the transmitter conditional information to be used by the transmitter in deciding whether to transmit one of the second packet or packets or to retransmit the first packet when the transmitter actually determines the outcome of the first packet transmission (e.g., by receiving or not receiving an acknowledgement signal).

The conditional information provided to the transmitter may instruct the transmitter to transmit one of the second packet or packets if the previous packet was successfully transmitted and to retransmit the first packet if the previous attempt to transmit the first packet was unsuccesssful as will be described herein.

Thus, wireless communication device 50 may include a transceiver or a transmitter 25 that may be used to transmit packets of information. Although the scope of the present invention is not limited in this respect, transmitter 25 may be adapted to transmit information in accordance with one of the communication protocols associated with cellular communication, WLAN protocols, PAN protocols, etc.

Types of cellular radiotelephone communication systems intended to be within the scope of the present invention include, although not limited to, Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, third generation (3G) systems like Wide-band CDMA (WCDMA), CDMA-2000, and the like.

WLAN protocols may include, but are not limited, the Institute for Electronics and Electrical Engineers (IEEE) 802.11 specification, the IEEE 802.3.16 specification, the IEEE 802.15 specification, etc., although the scope of the present invention is not limited by the particular communication protocol(s) employed. In addition, wireless communication device 50 may transmit packets to another communication device, a server, a base station, wireless access point (WAP), a switching station, etc. After attempting to transmit the packet, transmitter 25 may then inform packet selector 10 of the outcome of the transmission (indicated in FIG. 1 with an arrow 27). For example, transmitter 25 may provide a success or failure signal. Alternatively or additionally, transmitter 25 may provide other information associated with the attempted or most recent transmission. For example, transmitter 25 may inform packet selector 10 of such information as the signal to noise ration of the channel (s) being used, and the quality or number of the communication channels.

Figure 2:
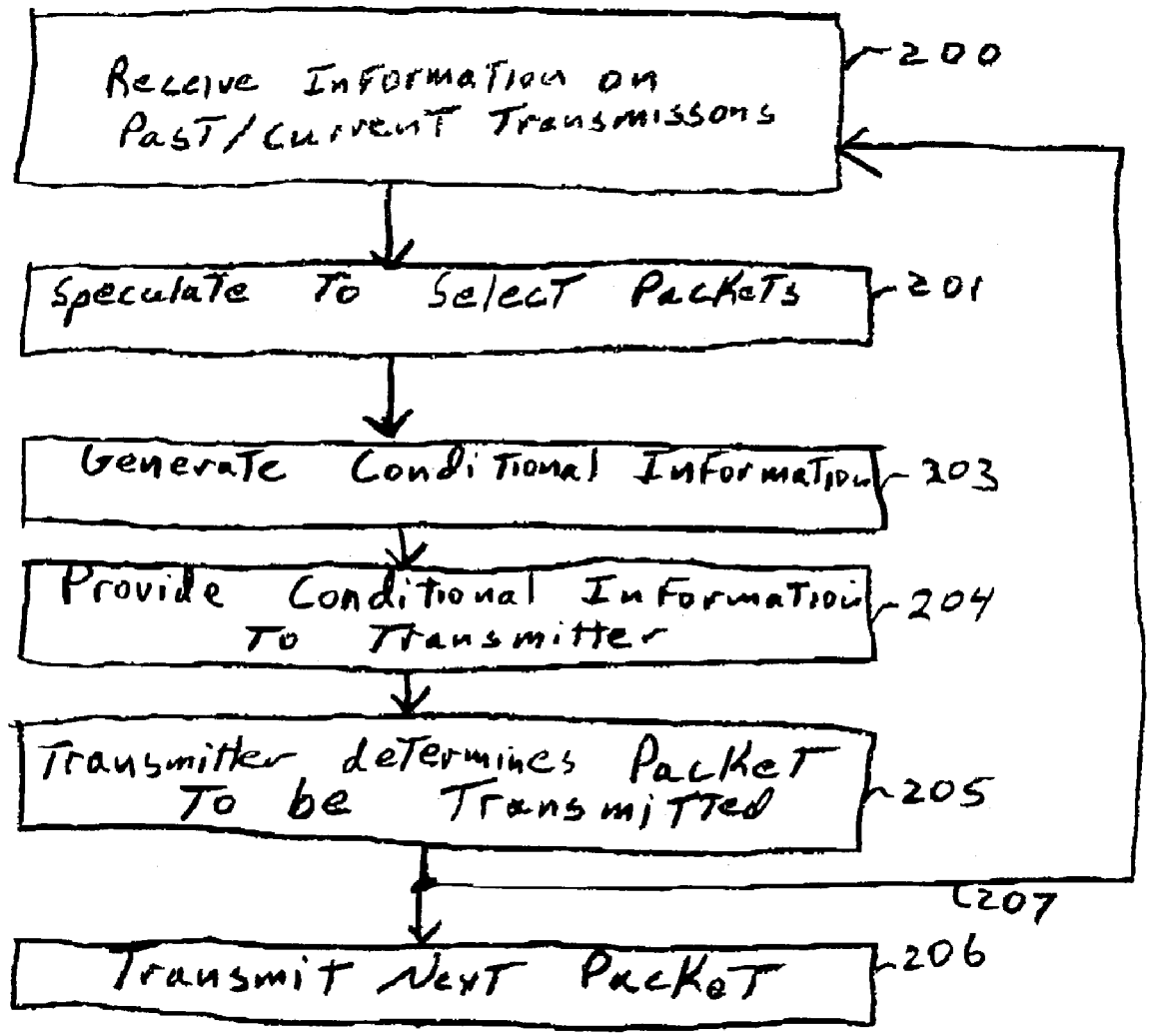
FIG. 2 is a flow chart of a method in accordance with an embodiment of the present invention.

Turning to FIG. 2, a method in accordance with a particular embodiment of the present invention is provided. The description of this particular embodiment begins with an assumption that queues 11 already contain packets to be transmitted since the scope of the present invention is not limited by the source of the packets or how the packets are organized in queues 11. To begin, box 200, packet selector 10 may receive information regarding prior and/or the current transmission by transmitter 25. For example, transmitter 25, processor 20, and/or memory 35 may provide information such has the success or failure of the transmission of packets, including the results of attempted transmissions of packet(s) in queues 11.

Alternatively, or in addition, packet selector 10 may be provided with information such as a quality indicator of the channel or channels used in prior transmissions, although the scope of the present invention is not limited in this respect. For example, packet selector 10 may be provided with a signal to noise ratio of the channel, interference information of the channel, quality of service information of the channel, cost information of the channel, etc.

In yet other embodiments, packet selector 10 may be informed of the success rate of transmitting packets to particular receivers (e.g. other nodes, servers, etc.) or information to indicate if a particular receiver(s) is going to be connected or disconnect from the network in the future. For example, packet selector 10 may be provided with information that indicates that a particular receiver is either moving away from wireless communication device 50 or may be disconnected from the network for other reasons, and thus, may not be available in the future to receive packets.

Packet selector may also be informed of information regarding the packets that are currently being stored for transmission by transmitter 25 including information regarding the packet or packets that transmitter 25 is currently attempting to transmit. It should be understood that the scope of the present invention is not limited so as to require any or all such information be available to packet selector 10. In addition, packet selector 10 may be provided with other types of data that may be used by packet selector 10 to help speculate and identify which packet or packets in queues 11 may be transmitted in an upcoming transmission by transmitter 25.

Packet selector 10 may then speculate as to which packet or packets should be transmitted next, box 201. Although the scope of the present invention is not limited in this respect, packet selector 10 may speculate as to which packet should be transmitted next based, at least in part, on assumptions associated with the success or failure of the current or most recent transmission by transmitter 25. For example, packet selector 10 may identify one packet to transmit next if the transmission of the current packet is successful and identify a second packet to transmit next if the current packet is not successfully transmitted. Alternatively, packet selector may indicate that another attempt should be made to transmit the current packet if the current attempt fails. It should be noted that in this particular embodiment, packet selector may be able to speculate which packet or packets are to be transmitted in an upcoming transmission cycle prior to receiving any indication as to the success of the current or most recent transmission.

In alternative embodiments, packet selector 10 may determine which packet or packets to transmit next using information associated with prior transmissions. For example, packet selector 10 may use any of the information described above (e.g. channel characteristics, historical success rates, etc.) to identify what packet should be transmitted next. Although the scope of the present invention is not limited in this respect, speculating may involve a predictive or a statistical model to determine not only what are the likely outcomes of the current or most recent transmissions, but also identify or determine what packet should then be selected for transmission for those outcome(s). It should also be understood that packet selector 10 may speculate as to more than two possible outcomes and may identify three or more packets for transmission for different possible outcomes.

After speculating what possible outcomes might arise and after identifying the packet(s) to be transmitted for those outcomes, packet selector 10 may determine or generate conditional information that may be used by transmitter 25, box 203. Simply stated, the conditional information may represent If-than statements that specify what course of actions is to be taken (i.e. what packet is to be transmitted) if a certain condition or event occurs.

For example, although the scope of the present invention is not limited in this respect, if the current attempt to transmit packet A is successful, then try to transmit packet B, else retransmit packet A. Alternatively, packet selector 10 may provide more complicated conditional information such as if the current attempt to transmit packet A is successful and a particular channel characteristics exists, then try to transmit packet B. If the channel characteristic does not exists, then try to transmit packet C, otherwise retransmit packet A.

Packet selector 10 may provide information to transmitter 25 so that transmitter may then be able to determine which packet to transmit next as soon as it learns the results of the current transmission, box 204. Thus, in this particular embodiment, although not necessarily all, packet selector 10 may have provided transmitter 25 with at least two packets of data for transmission along with conditional information to determine which of the at least two packets is transmitted.

The conditional information may take the form of any combination of logic signals, enable signals, or software instructions than may, in turn, be used by transmitter 25 to determine which packet is to be transmitted next. For example, packet selector 10 may provide transmitter 25 with a look up table, or its equivalent, that includes a list of possible outcomes, criteria to determine if the outcome occurred, and then what course of action is to be taken (e.g. what packet to transmit next).

Alternatively, packet selector 10 may provide transmitter 25 with just one additional packet (namely packet B) so that transmitter 25 comprises at least two packets, the current packet it is transmitting and packet B. In such an embodiment, transmitter 25 may then have a simpler choice to make based on a success or fail indicator of a prior or the most recent transmission. For example, transmitter 25 may retransmit the current packet if the current transmission attempt fails, or may transmit packet B if the current transmission is successful. It should be noted that in this particular embodiment, packet selector 10 may speculate and identify which packet(s) may be transmitted next prior to receiving any information about the success of the current transmission.

Thus, transmitter 25 may be provided with the next packet to transmit without having to wait for packet selector 10 to first identify the next packet to transmit based on the success on the last transmission. In this particular embodiment, packet selector 10 may be able to provide the next packet(s) to be transmitted and/or conditional information prior to completion of a current transmission which may improve the overall throughput or transmission data rate of wireless communication device 50.

Returning to the method shown in FIG. 2, upon completion of the current transmission, transmitter 25 may the compare the conditional information to the actual outcome of the most recent transmission in an attempt to determine which packet is to be transmitted next, box 205. For example, transmitter 25 may use the success or failure indicator from the last transmission to determine which packet is to be transmitted next. An advantage of this particular embodiment is that transmitter 25 already has the packets to be transmitted for the most likely outcomes, and thus, may proceed to begin transmitting the appropriate packet without having to wait for packet selector 10 to identify the appropriate packet.

Transmitter 25 may then begin to transmit the appropriate packet based on the conditional information, box 206. In addition, transmitter may also inform packet selector 10 of the outcome of the prior or most recent transmissions so that it may begin speculating as to the next packet or packets to be transmitted while transmitter 25 is transmitting the current packet (indicated with an arrow 207). It should be understood that the scope of the present invention is not limited in this respect as transmitter 25 may provide the results of the prior transmission prior to or after the transmission of the current packet. The method shown in FIG. 2 may continue until wireless communication device 50 has transmitted all the packets in queues 11, although the scope of the present invention is not limited in this respect.

It should also be understood that the scope of the present invention is not limited to the particular temporal relationships described above. For example, terms like "next" or "immediate" are not meant to limit the scope of the invention to require that the packet(s) provided by packet selector 10 are to be transmitted immediately upon receipt. In alternative embodiments, transmitter 25 may have one or more queues to store several packets and/or the conditional information associated with the packets. Thus, alternatively, packet selector may use information from the most recent transmission or a prior transmission, or both, to speculate as to what packet(s) is to be transmitted. In addition to or alternatively, packet selector 10 may provide transmitter 25 with packet that are to be transmitted in the next transmission or any upcoming transmission cycle.

It should also be understood that the scope of the present invention is not limited to the transmission of packets between a node and a server in a wireless local area network. The same techniques may be used to transmit packets between mobile devices in the same network. Alternatively, embodiments of the present invention may also be employed to transmit packets between a base station and a cellular transceiver in a cellular network.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. An apparatus comprising:
one or more storage structures to store a plurality of packets; and
a packet selector coupled to the one or more storage structures to provide to a transmitter a first packet from the one or more storage structures to be transmitted by the transmitter, and to preemptively provide to the transmitter a second packet from the one or more storage structures prior to receiving an indication of a success or failure of the transmission of the first packet, the second packet to be or not to be subsequently transmitted by the transmitter based at least in part upon the success or failure of the transmission of the first packet, said preemptively providing the second packet to the transmitter includes speculating as to possible outcomes of the transmission of the first packet by the transmitter, and based on the speculating to select the second packet from the one or more storage structures to preemptively provide the second packet to the transmitter.

2. The apparatus of claim 1, wherein the packet selector is adapted to preemptively provide to the transmitter a third packet from the one or more storage structures prior to receiving the indication of success or failure of the transmission of the first packet, the third packet to be or not to be subsequently transmitted by the transmitter based at least in part upon the success or failure of the transmission of first packet.

3. The apparatus of claim 2, wherein the packet selector is adapted to provide to the transmitter conditional information to be used by the transmitter to select the second or third packet for transmission if the first packet is successfully transmitted.

4. The apparatus of claim 1, wherein the transmitter is adapted to determine whether the first packet or the second packet is to be transmitted based on a determination that the first packet was successfully or unsuccessfully transmitted, respectively, and to transmit the first or the second packet accordingly.

5. The apparatus of claim 1, wherein the transmitter is adapted to provide to the packet selector information associated with prior transmission of a packet or packets preceding the transmission of the first packet, the provided information to be used by the packet selector, at least in part, to select the second packet from the plurality of packets of the one or more storage structures.

6. The apparatus of claim 1, wherein the packet selector is adapted to speculate based, at least in part, on a channel characteristic or historical success rates of packets previously transmitted by the transmitter that preceded the transmission of the first packet.

7. The apparatus of claim 1, wherein the packet selector is adapted to select the second packet from the plurality of packets of the one or more storage structures based on a quality indicator of a channel of previous transmission of one or more other packets preceding the transmission of the first packet.

8. The apparatus of claim 1, wherein the packet selector is adapted to select the second packet from the plurality of packets of the one or more storage structures based on a signal to noise ratio of a channel of previous transmission of one or more other packets preceding the transmission of the first packet.

9. The apparatus of claim 1 wherein the transmitter is adapted to receive from the packet selector a third packet from the one or more storage structures prior to determining the success or failure of the transmission of the first packet, the third packet to be or not to be subsequently transmitted by the transmitter based upon the success or failure of the transmission of first packet.

10. A method comprising:
providing by a packet selector to a transmitter a first packet to be transmitted by the transmitter; and
preemptively providing by the packet selector to the transmitter a second packet prior to the packet selector receiving an indication of a success or failure of the transmission of the first packet, the second packet to be or not to be subsequently transmitted by the transmitter based at least in part upon the success or failure of the transmission of the first packet, said preemptively providing the second packet to the transmitter includes speculating by the packet selector as to possible outcomes of the transmission of the first packet by the transmitter, and based on the speculating the packet selector to select the second packet from a plurality of packets to preemptively provide the second packet to the transmitter.

11. The method of claim 10, further comprising the transmitter providing to the packet selector information associated with prior transmission of a packet or packets preceding the transmission of the first packet, the provided information to be used by the packet selector, at least in part, to select the second packet from the plurality of packets.

12. The method of claim 10, wherein said speculating by the packet selector comprises speculating as to the possible outcomes of the transmission of the first packet by the transmitter based, at least in part, on a channel characteristic or historical success rates of other packets previously transmitted by the transmitter that preceded the transmission of the first packet.

13. The method of claim 10, further comprising selecting by the packet selector the second packet from the plurality of packets based at least on a quality indicator of a channel of previous transmission of one or more packets preceding the transmission of the first packet or on a signal to noise ratio of a channel of previous transmission of one or more other packets preceding the transmission of the first packet.

14. A wireless network comprising:
at least two nodes adapted to wirelessly transmit and receive packets, wherein at least one of the nodes includes one or more storage structures to store a plurality of packets, a transmitter, and a packet selector coupled to the one or more storage structures and the transmitter to provide to the transmitter a first packet from the one or more storage structures to be transmitted by the transmitter, and to preemptively provide to the transmitter a second packet from the one or more storage structures prior to receiving an indication of a success or failure of the transmission of the first packet, the second packet to be or not to be subsequently transmitted by the transmitter based upon the success or failure of the transmission of the first packet, said preemptively providing the second packet to the transmitter includes speculating as to possible outcomes of the transmission of the first packet by the transmitter, and based on the speculating to select the second packet from the one or more storage structures to preemptively provide the second packet to the transmitter.

15. The wireless network of claim 14; further comprising at least one base station to communication with the at least two nodes, wherein the at least two nodes comprise a cellular transceiver.

16. The wireless network of claim 14, wherein the wireless network comprises a wireless local area network.

17. The wireless network of claim 16, further comprising a server adapted to communicate with the at least two nodes.

18. The wireless network of claim 16, wherein the at least two nodes are adapted to transmit packets to each other.

19. An article of manufacture comprising
a storage medium; and
a plurality of instructions stored thereon, that, when executed by an apparatus, results in:
the apparatus providing a transmitter coupled with the apparatus a first packet to be transmitted by the transmitter, and to preemptively provide to the transmitter at least a second packet prior to receiving an indication of a success or failure of the transmission of the first packet, at least the second packet to be or not to be subsequently transmitted by the transmitter based upon the success or failure of the transmission of the first packet, said apparatus to preemptively provide the second packet to the transmitter by speculating as to possible outcomes of the transmission of the first packet by the transmitter, and based on the speculating to select the second packet from a plurality of packets to preemptively provide the second packet to the transmitter.

20. The article of claim 19, wherein the instructions, when executed, further result in the apparatus to speculate based, at least in part, on a channel characteristic or historical success rates of other packets previously transmitted preceding the transmission of the first packet.

21. The article of claim 19, wherein the instructions, when executed, further result in the apparatus to select based at least on a quality indicator of a channel of previous transmission of one or more packets preceding the transmission of the first packet or on a signal to noise ratio of a channel previous transmission of one or more other packets preceding the transmission of the first packet.

* * * * *